United States Patent
Zhang et al.

(10) Patent No.: US 11,507,235 B2
(45) Date of Patent: Nov. 22, 2022

(54) TOUCH CONTROL DEVICE, TOUCH CONTROL DISPLAY SUBSTRATE AND DISPLAY APPARATUS

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Xinxiu Zhang, Beijing (CN); Shifeng Xu, Beijing (CN); Xiaodong Xie, Beijing (CN); Lei Zhang, Beijing (CN); Min He, Beijing (CN); Tengfei Zhong, Beijing (CN); Bin Pang, Beijing (CN)

(73) Assignees: HEFEI XINSHENG OPTOELECTRONICS TECHNOLOGY CO., LTD., Anhui (CN); BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 0 days.

(21) Appl. No.: 16/397,498

(22) Filed: Apr. 29, 2019

(65) Prior Publication Data
US 2020/0012386 A1     Jan. 9, 2020

(30) Foreign Application Priority Data

Jul. 3, 2018    (CN) .......................... 201810718191.3

(51) Int. Cl.
G06F 3/044     (2006.01)
G06F 3/041     (2006.01)

(52) U.S. Cl.
CPC .......... *G06F 3/0446* (2019.05); *G06F 3/0412* (2013.01); *G06F 3/0416* (2013.01);
(Continued)

(58) Field of Classification Search
None
See application file for complete search history.

(56) References Cited

U.S. PATENT DOCUMENTS 10,114,491 B1 * 10/2018 Han .................. G06F 3/0412
2013/0278513 A1    10/2013 Jang
(Continued)

FOREIGN PATENT DOCUMENTS

| CN | 103376938 A  | 10/2013 |
|----|--------------|---------|
| CN | 107765914 A  | 3/2018  |
| KR | 101792236 B1 | 10/2017 |

OTHER PUBLICATIONS

First Office Action for Chinese Application No. 201810718191.3, dated Nov. 2, 2020, 8 Pages.

*Primary Examiner* — Benjamin X Casarez
(74) *Attorney, Agent, or Firm* — Brooks Kushman P.C.

(57) ABSTRACT

A touch control device is provided and includes a base substrate and a metal pattern on the base substrate. The metal pattern includes a first metal pattern and a second metal pattern. The first metal pattern and the second metal pattern are in different layers. The first metal pattern includes a first touch control electrode and a first virtual graphic that is insulated from the first touch control electrode. The second metal pattern includes a second touch control electrode and a second virtual graphic that is insulated from the second touch control electrode. An orthographic projection of the metal pattern to the base substrate is a regular grid.

15 Claims, 3 Drawing Sheets

(52) U.S. Cl.
 CPC .. *G06F 3/0448* (2019.05); *G06F 2203/04102* (2013.01); *G06F 2203/04112* (2013.01)

(56) References Cited

U.S. PATENT DOCUMENTS

| | | | |
|---|---|---|---|
| 2014/0299361 A1* | 10/2014 | Nakamura | G06F 3/0445 174/253 |
| 2017/0115770 A1* | 4/2017 | Han | G06F 3/0445 |
| 2017/0329455 A1* | 11/2017 | Zeng | G06F 3/0412 |
| 2019/0008041 A1* | 1/2019 | Nakamura | G06F 3/0445 |
| 2019/0107908 A1* | 4/2019 | Zeng | G06F 3/0445 |
| 2019/0138137 A1* | 5/2019 | Sakaue | G06F 3/0445 |
| 2019/0146605 A1* | 5/2019 | Xu | G06F 3/0446 |
| 2019/0204952 A1* | 7/2019 | Han | G06F 3/0412 |
| 2019/0317631 A1* | 10/2019 | Feng | G06F 3/0412 |
| 2019/0377457 A1* | 12/2019 | Nakayama | G06F 3/044 |

\* cited by examiner

TOUCH CONTROL DEVICE, TOUCH CONTROL DISPLAY SUBSTRATE AND DISPLAY APPARATUS

CROSS-REFERENCE TO RELATED APPLICATION

This application claims priority to Chinese Patent Application No. 201810718191.3 filed on Jul. 3, 2018, which is incorporated in its entirety by reference herein.

TECHNICAL FIELD

The present disclosure relates to the field of display technologies, and in particular to a touch control device, a touch control display substrate and a display apparatus.

BACKGROUND

With the development of touch control technologies and the increasing popularity of electronic products, capacitive touch screens have received extensive attention on smartphones, tablet computers, desktop computers, in-vehicle devices, and wearable devices due to their advantages such as long service life and responsiveness.

SUMMARY

One embodiment of the present disclosure provides a touch control device that includes: a base substrate and a metal pattern on the base substrate. The metal pattern includes a first metal pattern and a second metal pattern; the first metal pattern and the second metal pattern are in different layers. The first metal pattern includes a first touch control electrode and a first virtual graphic that is insulated from the first touch control electrode. The second metal pattern includes a second touch control electrode and a second virtual graphic that is insulated from the second touch control electrode. An orthographic projection of the metal pattern to the base substrate is a regular grid.

In one embodiment, materials of the first virtual graphic and the first touch control electrode are identical; and materials of the second virtual graphic and the second touch control electrode are identical.

In one embodiment, patterns of the first metal pattern and the second metal pattern are identical.

In one embodiment, the first virtual graphic has a diamond shape, and the second virtual graphic has a diamond shape; the diamond shape of the first virtual graphic has the same size as the diamond shape of the second virtual graphic. The first touch control electrode includes a plurality of parallel first wiring lines and a plurality of parallel second wiring lines; an intersection point of the first wiring line and the second wiring line is located at a point of the diamond shape in the first virtual graphic; the first wiring line and the second wiring line are parallel to edges of the diamond shape, respectively. The second touch control electrode includes a plurality of parallel third wiring lines and a plurality of parallel fourth wiring lines; an intersection point of the third wiring line and the fourth wiring line is located at a point of the diamond shape in the second virtual graphic; the third wiring line and the fourth wiring line are parallel to edges of the diamond shape, respectively.

In one embodiment, in the first metal pattern, at each junction of the first virtual graphic and the first touch electrode, there is a notch in the first virtual graphic; the first wiring line is in a corresponding notch and is spaced apart from the first virtual graphic; and the second wiring line is in a corresponding notch and is spaced apart from the first virtual graphic.

In one embodiment, for each notch, in a direction perpendicular to the first wiring line or the second wiring line in the each notch, a width of the each notch is in a range of from 8 um to 10 um.

In one embodiment, in the second metal pattern, at each junction of the second virtual graphic and the second touch electrode, there is a notch in the second virtual graphic; the third wiring line is in a corresponding notch and is spaced apart from the second virtual graphic; and the fourth wiring line is in a corresponding notch and is spaced apart from the second virtual graphic.

In one embodiment, for each notch in the second virtual graphic, in a direction perpendicular to the first wiring line or the second wiring line in the each notch in the second virtual graphic, a width of the each notch in the second virtual graphic is in a range of from 8 um to 10 um.

One embodiment of the present disclosure provides a touch control display substrate including the above touch control device.

In one embodiment, the base substrate of the touch control device is reused as a base substrate of the touch control display substrate.

In one embodiment, the touch control display substrate further includes a plurality of sub-pixels; an orthographic projection of the sub-pixels to the base substrate is in the grid of the metal pattern.

In one embodiment, a shape of each cell of the grid is the same as a shape of the sub-pixel.

In one embodiment, the grid of the metal pattern is in a gap among the sub-pixels.

In one embodiment, the touch control display substrate is a flexible organic light emitting diode touch control display substrate.

One embodiment of the present disclosure provides a touch control display apparatus including the above touch control display substrate.

BRIEF DESCRIPTION OF THE DRAWINGS

In order to illustrate technical solutions according to embodiments of the present disclosure more clearly, drawings to be used in the description of the embodiments will be described briefly hereinafter. Apparently, the drawings described hereinafter are only some embodiments of the present disclosure, and other drawings may be obtained by those skilled in the art according to those drawings without creative work.

DETAILED DESCRIPTION

Figure 1:
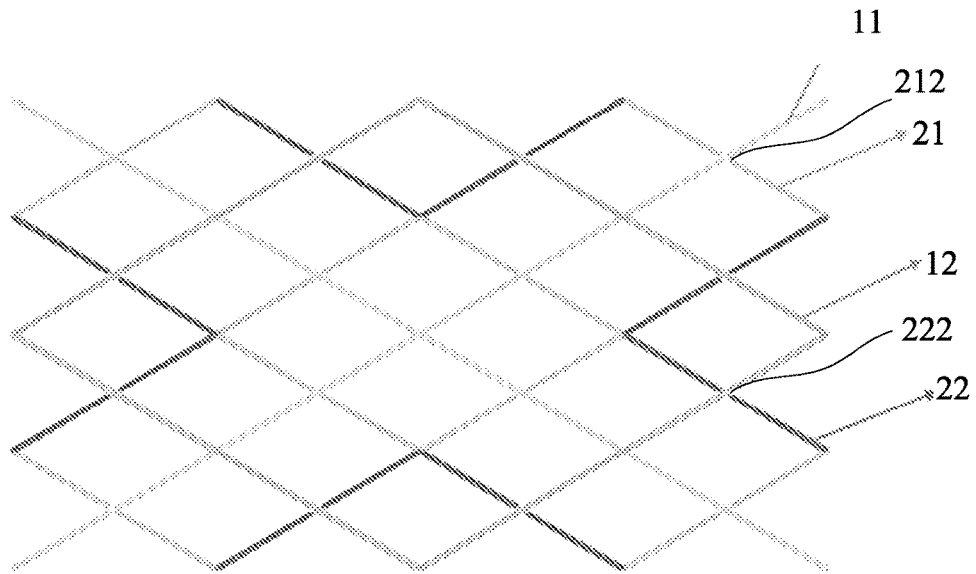
FIG. 1 is a schematic view of a metal pattern according to an embodiment of the present disclosure.
Figure 2:
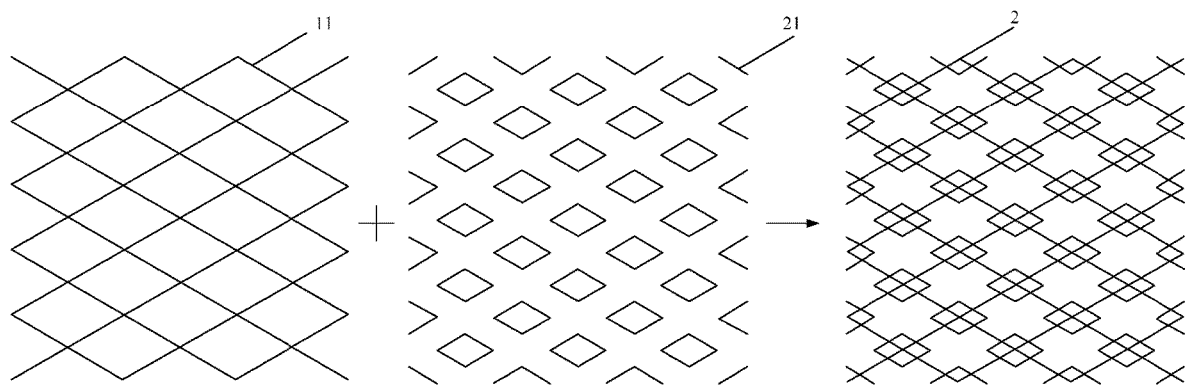
FIG. 2 is a schematic view of a first metal pattern according to an embodiment of the present disclosure.
Figure 3:
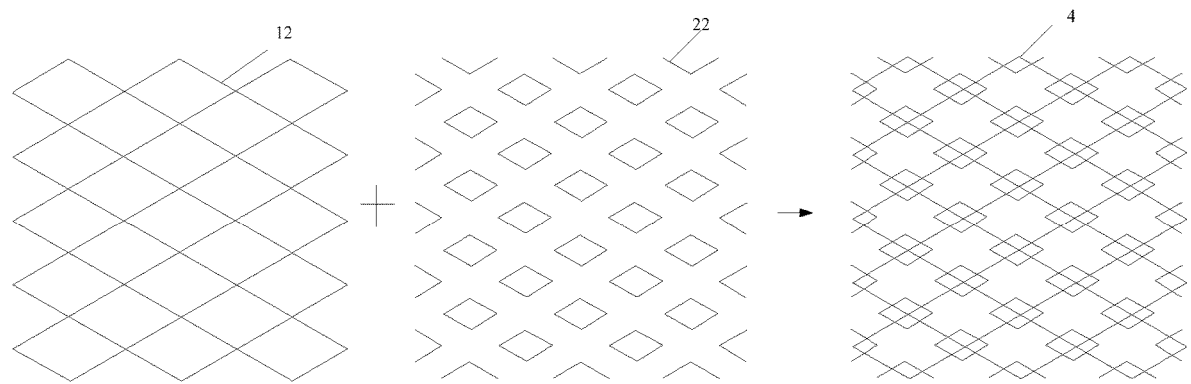
FIG. 3 is a schematic view of a second metal pattern according to an embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

One touch electrode of a touch screen in the related art is generally made of indium tin oxide (ITO) material. However, the ITO material is easily broken and is difficult to withstand bending. When the touch screen is bent, the touch electrode may be broken, which affects the service life and performance of a display device. In addition, the ITO has a large square resistance and is relatively expensive. Thus, one metal electrode has become a potential material for replacing the ITO electrode by virtue of its advantages such as low cost, good ductility and low square resistance.

With the continuous improvement of the touch technology and diversified application scenarios, display product manufacturers have introduced the active capacitive pen touch technology. The active capacitive pen touch technology has been widely recognized and favored by consumers due to its high-precision touch and real-writing touch experience, so this technology is rapidly popularized. Since the active capacitive pen touch technology has high requirements for electrical performance of the touch screen, it also accelerates the promotion and application of the metal electrode.

Since the metal electrode itself is opaque, in order to meet the requirements of light transmittance, the metal electrode is usually designed as a fine metal grid, and the grid density affects the channel impedance and capacitance. The active capacitive pen touch technology requires that the Tx (drive electrode) channel and the Rx (sensing electrode) channel have a small self-contained capacity, so the metal grid spacing is relatively large, but the sparse metal grid is easily caught by the human eye, resulting in poor vanishing effect in the dark state of the touch screen.

In the related art, in order to improve the vanishing effect, a virtual graphic is inserted between metal electrodes to improve the metal grid density under the premise of satisfying the electrical performance of the channel. However, in the related art, the virtual graphic is generally disposed in a layer where the Tx is located or where the Rx is located, which causes densities of the metal grids of Tx and Rx in two layers to be different. Due to the difference in reflectivity between the two layers of Tx and Rx, the unevenly distributed grids may still be visually recognized by the human eye. Therefore, there is still a vanishing problem, which causes non-uniformity of impedance and capacitance and then results in response delay.

In order to solve the above technical problems, embodiments of the present disclosure provide a touch control device, a touch control display substrate and a display apparatus.

One embodiment of the present disclosure provides a touch control device. As shown in FIG. 1, the touch control device includes a base substrate and a metal pattern disposed on the base substrate. The metal pattern includes a first metal pattern and a second metal pattern. The first metal pattern and the second metal pattern are in different layers. The first metal pattern includes a first touch control electrode 11 and a first virtual graphic 21 which is insulated from the first touch control electrode 11. The second metal pattern includes a second touch control electrode 12 and a second virtual graphic 22 which is insulated from the second touch control electrode 12. An orthographic projection of the metal pattern to the base substrate is a regular grid.

In one embodiment, the touch electrodes are made of metal material. Compared with the ITO material, the metal material has better ductility and is not easily broken. Thus, when the touch electrodes are made of metal material, bendability of the touch control device can be improved, thereby enabling the touch control device to be suitable for flexible display devices.

Further, in addition to the touch electrodes, the metal pattern further includes virtual graphics, thereby enabling the orthographic projection of the metal pattern to the base substrate to be a regular grid. This can ensure uniformity of light transmittance of the entire touch control device, improve vanishing problem and then improve display effect of a display apparatus with the touch control device, while meeting requirements of an active capacitive pen touch technology with low channel self-capacity and high precision. In addition, the virtual graphics are not in an identical layer but are in two layers, thereby improving reflectance differences caused by uneven distribution of two layers of metal and then further improving the vanishing effect.

Further, the first virtual graphic 21 and the first touch control electrode 11 may be made of the same material, and the second virtual graphic 22 and the second touch control electrode 12 may be made of the same material. In this way, the first virtual graphic 21 and the first touch control electrode 11 may be prepared simultaneously through a patterning process, and the second virtual graphic 22 and the second touch control electrode 12 may be prepared simultaneously through a patterning process, thereby reducing the quantity of patterning process for the touch control device and then reducing the production cost of the touch control device.

Further, patterns of the first metal pattern and the second metal pattern are identical. Such design can ensure uniformity of channel impedance and capacitance. Moreover, the metal pattern is distributed in two layers, which can further improve reflectance differences caused by uneven distribution of two layers of metal and then further improve the vanishing effect.

In one embodiment, as shown in FIG. 2 to FIG. 5, in the touch control device, the first virtual graphic 21 has a diamond shape, and the first touch control electrode 11 includes a plurality of parallel first wiring lines and a plurality of parallel second wiring lines. The first virtual graphic 21 and the first touch control electrode 11 form the first metal pattern 2. An intersection point of the first wiring line and the second wiring line is located at a point of the diamond shape in the first virtual graphic 21. The first wiring line and the second wiring line are parallel to edges of the diamond shape, respectively.

The second virtual graphic 22 has a diamond shape, and the second touch control electrode 12 includes a plurality of parallel third wiring lines and a plurality of parallel fourth wiring lines. The second virtual graphic 22 and the second touch control electrode 12 form the second metal pattern 4. An intersection point of the third wiring line and the fourth wiring line is located at a point of the diamond shape in the second virtual graphic 22. The third wiring line and the fourth wiring line are parallel to edges of the diamond shape, respectively.

Figure 4:
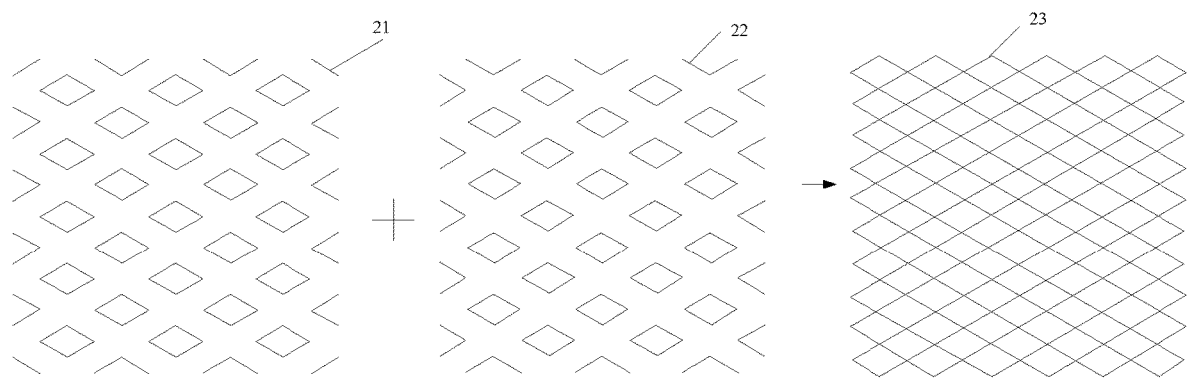
FIG. 4 is a schematic view showing superposition of an orthographic projection of a first virtual graphic to a substrate and an orthographic projection of a second virtual graphic to the substrate according to an embodiment of the present disclosure.
Figure 5:
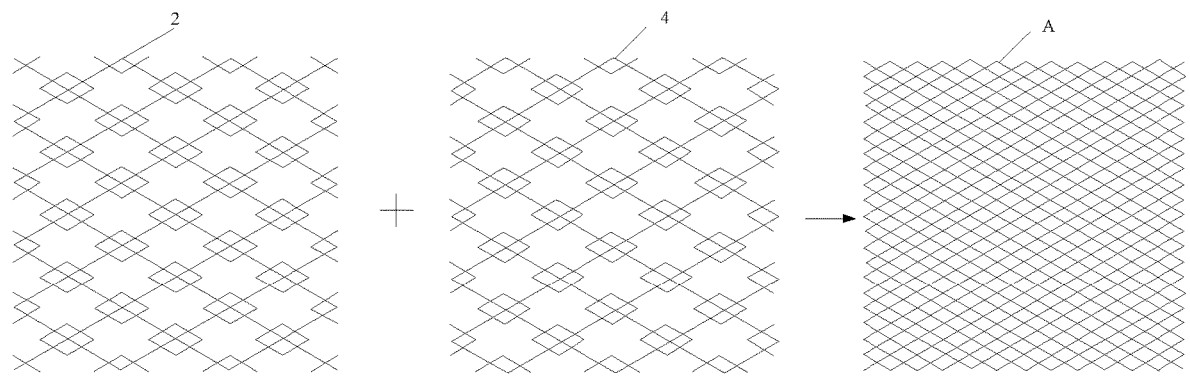
FIG. 5 is a schematic view showing superposition of an orthographic projection of a first metal pattern to a substrate and an orthographic projection of a second metal pattern to the substrate according to an embodiment of the present disclosure.

As shown in FIG. 4, the diamond shape of the first virtual graphic 21 has the same size as the diamond shape of the second virtual graphic, and the diamond shapes of the first virtual graphic 21 and the diamond shapes of the second virtual graphic together define a grid. As shown in FIG. 5, an orthographic projection A of the first metal pattern 2 and the second metal pattern 4 to a substrate is a regular grid. The patterns of the first metal pattern 2 and the second metal pattern 4 are identical, and have the same density. A width of a cell of the grid may be in a range of from 160 um to 440 um, specifically 300 um.

In the first metal pattern 2, at each junction of the first virtual graphic 21 and the first touch electrode 11, there is a notch 212 in the first virtual graphic 21. The presence of the notch 212 enables the first virtual graphic 21 to be insulated from the first touch electrode 11. A width of the notch 212 may be in a range of from 8 um to 10 um, thereby avoiding the breakdown problems.

In the second metal pattern 4, at each junction of the second virtual graphic 22 and the second touch electrode 12, there is a notch 222 in the second virtual graphic 22. The presence of the notch 222 enables the second virtual graphic 22 to be insulated from the second touch electrode 12. A width of the notch 222 may be in a range of from 8 um to 10 um, thereby avoiding the breakdown problems.

In this embodiment, the two layers of evenly distributed metal patterns can improve vanishing problem of the product under while ensuring the best moiré, and improve uniformity of channel impedance and capacitance. Further, the notches 212 and 222 in the two layers of metal patterns are just staggered so as to prevent electrostatic breakdown.

One embodiment of the present disclosure further provides a touch control display substrate including the above touch control device.

In one embodiment, the touch electrodes are made of metal material. Compared with the ITO material, the metal material has better ductility and is not easily broken. Thus, when the touch electrodes are made of metal material, bendability of the touch control device can be improved, thereby enabling the touch control device to be suitable for flexible display devices.

Further, in addition to the touch electrodes, the metal pattern further includes virtual graphics, thereby enabling the orthographic projection of the metal pattern to the base substrate to be a regular grid. This can ensure uniformity of light transmittance of the entire touch control device, improve vanishing problem and then improve display effect of a display apparatus with the touch control device, while meeting requirements of an active capacitive pen touch technology with low channel self-capacity and high precision. In addition, the virtual graphics are not in an identical layer but are in two layers, thereby improving reflectance differences caused by uneven distribution of two layers of metal and then further improving the vanishing effect.

The touch control device may be applied in an add-on touch control display substrate or an embedded touch control display substrate.

When the touch control device is applied in the embedded touch control display substrate, the base substrate of the touch control device can be reused as a base substrate of the touch control display substrate. In this way, the touch control device is integrally into the display substrate, thereby reducing a thickness of a touch control display apparatus including the touch control display substrate and then achieving ultra-thin display.

Further, the touch control display substrate further includes a plurality of sub-pixels. An orthographic projection of the sub-pixels to the base substrate is in the grid of the metal pattern, i.e., the grid of the metal pattern is in a gap among the sub-pixels, thereby not affecting normal displaying.

Further, the shape of the cell of the grid is the same as the shape of the sub-pixel. In this way, the sub-pixels can fill gaps of cells of the grid, thereby maximizing an aperture ratio of the touch control display substrate.

Further, the touch control display substrate is a flexible organic light emitting diode touch control display substrate. Since the metal material has better ductility and is not easily broken. Thus, when the touch electrodes are made of metal material, bendability of the touch control device can be improved, thereby enabling the touch control device to be suitable for flexible display devices.

One embodiment of the present disclosure further provides a touch control display apparatus including the above touch control display substrate. The touch control display apparatus may be any product or component having displaying function, such as a television, a monitor, a digital photo-frame, a mobile phone, a tablet computer. The touch control display apparatus further includes a flexible circuit board, a printed circuit board and a back plate.

The method for manufacturing the touch control device according to one embodiment of the present disclosure will be further described hereinafter in conjunction with the accompanying drawings.

Figure 6:
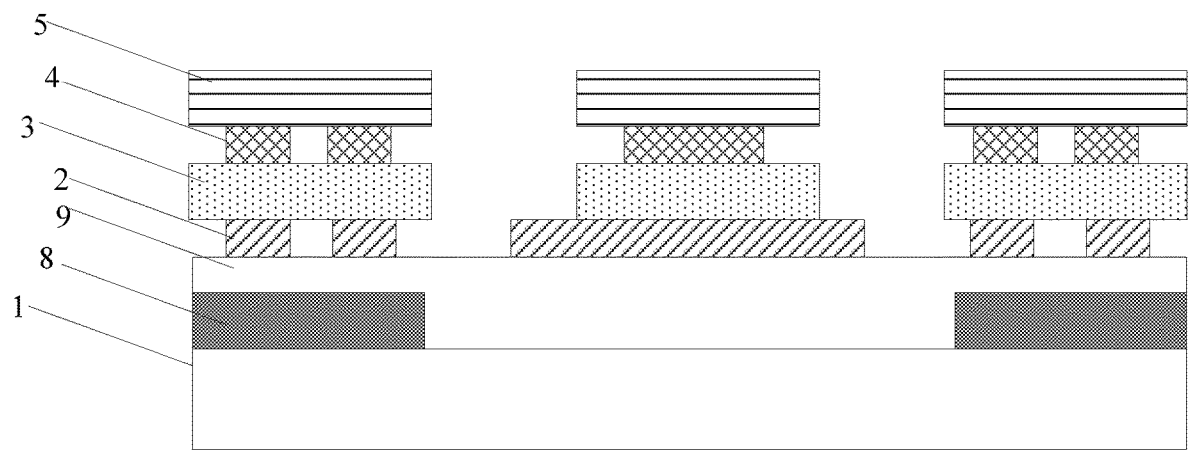
FIG. 6 is a schematic cross-sectional view of an add-on touch control device according to an embodiment of the present disclosure.

In one embodiment, the touch control device is suitable for an add-on touch control display substrate. Referring to FIG. 6, the method for manufacturing the touch control device includes the following steps 1 to 6.

The step 1 is to provide a base substrate 1 and form a pattern of a black matrix 8 on the base substrate.

The base substrate 1 may be a glass substrate or a quartz substrate. Specifically, a light shading material layer is formed on the base substrate 1; then, a layer of photoresist is coated on the light shielding material layer. The photoresist is then exposed with a mask plate, thereby causing the photoresist to form into a photoresist-unreserved region and a photoresist-reserved region. The photoresist-reserved region is corresponding to a region where the pattern of the black matrix 8 is located. The photoresist-unreserved region is corresponding to a region except for the above region where the pattern of the black matrix 8 is located. Developing treatment is performed to completely remove the photoresist at the photoresist-unreserved region with a thickness of the photoresist at the photoresist-unreserved region remaining unchanged. The light shading material layer at the photoresist-unreserved region is completely etched away by an etching process and the remained photoresist is stripped away, thereby forming the pattern of the black matrix 8.

The step 2 is to form a planarization layer 9.

The planarization layer 9 is formed on the base substrate 1 which has been treated in the step 1. The planarization layer 9 may be made of organic material or inorganic material, and may play the role of insulation and increasing strength.

The step 3 is to form a first metal pattern 2.

Specifically, a metal layer with a thickness in a range of from 500 Å to 4000 Å may be deposited via sputtering or thermal evaporation on the base substrate 1 which has been treated in the step 2. The metal layer may be made of metal such as Cu, Al, Ag, Mo, Cr, Nd, Ni, Mn, Ti, Ta, and W, or an alloy of these metal. The metal layer may be a single-layer structure or a multi-layer structure. The multi-layer structure may be Cu\Mo, Ti\Cu\Ti, or Mo\Al\Mo. A layer of photoresist is coated on the metal layer. The photoresist is then exposed with a mask plate, thereby causing the photoresist to form into a photoresist-unreserved region and a photoresist-reserved region. The photoresist-reserved region is corresponding to a region where the first metal pattern is located. The photoresist-unreserved region is corresponding to a region except for the above region where the first metal pattern is located. Developing treatment is performed to completely remove the photoresist at the photoresist-unreserved region with a thickness of the photoresist at the photoresist-unreserved region remaining unchanged. The metal layer at the photoresist-unreserved region is completely etched away by an etching process and the remained photoresist is stripped away, thereby forming the first metal pattern 2.

The step 4 is to form a first insulation layer 3.

The first insulation layer 3 may be made of inorganic material or organic material. Specifically, the first insulation layer 3 with a thickness in a range of from 500 Å to 5000 Å may be deposited via the plasma enhanced chemical vapor deposition (PECVD) process on the base substrate 1 which has been treated in the step 3. The first insulation layer 3 may be made of oxide, nitride or oxygen and nitrogen compounds.

The step 5 is to form a second metal pattern 4.

Specifically, a metal layer with a thickness in a range of from 500 Å to 4000 Å may be deposited via sputtering or thermal evaporation on the base substrate 1 which has been treated in the step 4. The metal layer may be made of metal such as Cu, Al, Ag, Mo, Cr, Nd, Ni, Mn, Ti, Ta, and W, or an alloy of these metal. The metal layer may be a single-layer structure or a multi-layer structure. The multi-layer structure may be Cu\Mo, Ti\Cu\Ti, or Mo\Al\Mo. A layer of photoresist is coated on the metal layer. The photoresist is then exposed with a mask plate, thereby causing the photoresist to form into a photoresist-unreserved region and a photoresist-reserved region. The photoresist-reserved region is corresponding to a region where the second metal pattern 4 is located. The photoresist-unreserved region is corresponding to a region except for the above region where the second metal pattern is located. Developing treatment is performed to completely remove the photoresist at the photoresist-unreserved region with a thickness of the photoresist at the photoresist-unreserved region remaining unchanged. The metal layer at the photoresist-unreserved region is completely etched away by an etching process and the remained photoresist is stripped away, thereby forming the second metal pattern 4.

The step 6 is to form a second insulation layer 5.

The second insulation layer 5 may be made of inorganic material or organic material. Specifically, the second insulation layer 5 with a thickness in a range of from 500 Å to 5000 Å may be deposited via the plasma enhanced chemical vapor deposition (PECVD) process on the base substrate 1 which has been treated in the step 5. The second insulation layer 5 may be made of oxide, nitride or oxygen and nitrogen compounds.

The touch control device shown in FIG. 6 can be obtained through the above steps 1 to 6.

Figure 7:
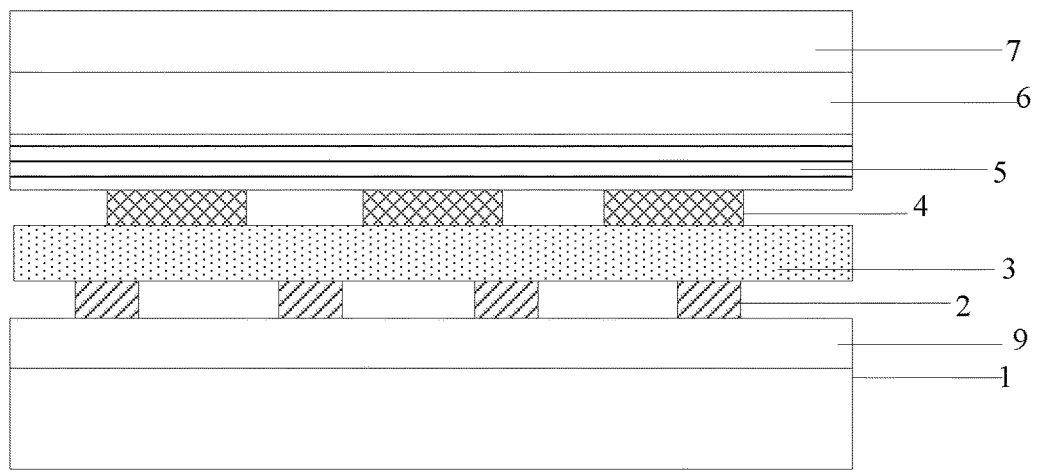
FIG. 7 is a schematic cross-sectional view of an embedded touch control device according to an embodiment of the present disclosure.

In one embodiment, the touch control device is suitable for an embedded touch control display substrate. Referring to FIG. 7, the method for manufacturing the touch control device includes the following steps 1 to 7.

The step 1 is to provide a base substrate 1 and form a planarization layer 9 on the base substrate.

In this embodiment, the base substrate 1 is reused as a base substrate for a color substrate of the touch control display substrate. A color filter of the color substrate is disposed at another side of the base substrate. Since the color substrate is provided with a black matrix, the black matrix may be omitted from the touch control device.

The base substrate 1 may be a glass substrate or a quartz substrate. The planarization layer 9 is formed on the base substrate 1. The planarization layer 9 may be made of organic material or inorganic material.

The step 2 is to form a first metal pattern 2.

Specifically, a metal layer with a thickness in a range of from 500 Å to 4000 Å may be deposited via sputtering or thermal evaporation on the base substrate 1 which has been treated in the step 1. The metal layer may be made of metal such as Cu, Al, Ag, Mo, Cr, Nd, Ni, Mn, Ti, Ta, and W, or an alloy of these metal. The metal layer may be a single-layer structure or a multi-layer structure. The multi-layer structure may be Cu\Mo, Ti\Cu\Ti, or Mo\Al\Mo. A layer of photoresist is coated on the metal layer. The photoresist is then exposed with a mask plate, thereby causing the photoresist to form into a photoresist-unreserved region and a photoresist-reserved region. The photoresist-reserved region is corresponding to a region where the first metal pattern 2 is located. The photoresist-unreserved region is corresponding to a region except for the above region where the first metal pattern is located. Developing treatment is performed to completely remove the photoresist at the photoresist-unreserved region with a thickness of the photoresist at the photoresist-unreserved region remaining unchanged. The metal layer at the photoresist-unreserved region is completely etched away by an etching process and the remained photoresist is stripped away, thereby forming the first metal pattern 2.

The step 3 is to form a first insulation layer 3.

The first insulation layer 3 may be made of inorganic material or organic material. Specifically, the first insulation layer 3 with a thickness in a range of from 500 Å to 5000 Å may be deposited via the plasma enhanced chemical vapor deposition (PECVD) process on the base substrate 1 which has been treated in the step 2. The first insulation layer 3 may be made of oxide, nitride or oxygen and nitrogen compounds.

The step 4 is to form a second metal pattern 4.

Specifically, a metal layer with a thickness in a range of from 500 Å to 4000 Å may be deposited via sputtering or thermal evaporation on the base substrate 1 which has been treated in the step 3. The metal layer may be made of metal such as Cu, Al, Ag, Mo, Cr, Nd, Ni, Mn, Ti, Ta, and W, or an alloy of these metal. The metal layer may be a single-layer structure or a multi-layer structure. The multi-layer structure may be Cu\Mo, Ti\Cu\Ti, or Mo\Al\Mo. A layer of photoresist is coated on the metal layer. The photoresist is then exposed with a mask plate, thereby causing the photoresist to form into a photoresist-unreserved region and a photoresist-reserved region. The photoresist-reserved region is corresponding to a region where the second metal pattern 4 is located. The photoresist-unreserved region is corresponding to a region except for the above region where the second metal pattern is located. Developing treatment is performed to completely remove the photoresist at the photoresist-unreserved region with a thickness of the photoresist at the photoresist-unreserved region remaining unchanged. The metal layer at the photoresist-unreserved region is completely etched away by an etching process and the remained photoresist is stripped away, thereby forming the second metal pattern 4.

The step 5 is to form a second insulation layer 5.

The second insulation layer 5 may be made of inorganic material or organic material. Specifically, the second insulation layer 5 with a thickness in a range of from 500 Å to 5000 Å may be deposited via the plasma enhanced chemical vapor deposition (PECVD) process on the base substrate 1 which has been treated in the step 5. The second insulation layer 5 may be made of oxide, nitride or oxygen and nitrogen compounds.

The step 6 is to form a polarizer 6 on the second insulation layer 5.

The step 7 is to attach a package cover 7 on the polarizer 6.

The touch control device shown in FIG. 7 can be obtained through the above steps 1 to 7.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

The above are merely the optional embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

What is claimed is:

1. A touch control device comprising:
a base substrate; and
a metal pattern on the base substrate;
wherein the metal pattern includes a first metal pattern and a second metal pattern;
the first metal pattern and the second metal pattern are in different layers; the first metal pattern includes a first touch control electrode and a plurality of first virtual graphics that are insulated from the first touch control electrode and are spaced from each other; the second metal pattern includes a second touch control electrode and a plurality of second virtual graphics that are insulated from the second touch control electrode and are spaced from each other; and orthographic projections of the plurality of first virtual graphics to the base substrate and orthographic projections of the plurality of second virtual graphics to the base substrate are alternately arranged side by side without overlapping, thereby enabling an orthographic projection of the metal pattern to the base substrate to be a regular grid;
wherein all of the plurality of first virtual graphics are in a first layer; within the first layer, every two adjacent first virtual graphics are spaced from each other; and all of the plurality of second virtual graphics are in a second layer; within the second layer, every two adjacent second virtual graphics are spaced from each other;
wherein the first layer is spaced from the second layer in a direction perpendicularly to the base substrate;
wherein there are only the plurality of first virtual graphics which are spaced from each other, without other virtual graphics, in the first layer; and there are only the plurality of second virtual graphics which are spaced from each other, without other virtual graphics, in the second layer;
wherein patterns of the first metal pattern and the second metal pattern are identical;
wherein each of the plurality of first virtual graphics has a diamond shape, and each of the plurality of second virtual graphics has a diamond shape; the diamond shape of each of the plurality of first virtual graphics has the same size as the diamond shape of each of the plurality of second virtual graphics;
the first touch control electrode includes a plurality of parallel first wiring lines and a plurality of parallel second wiring lines; an intersection point of each of the plurality of first wiring lines and each of the plurality of second wiring lines is located at a point of the diamond shape of each of the plurality of first virtual graphics; each of the plurality of first wiring lines and each of the plurality of second wiring lines are parallel to edges of the diamond shape, respectively;
the second touch control electrode includes a plurality of parallel third wiring lines and a plurality of parallel fourth wiring lines; an intersection point of each of the plurality of third wiring lines and each of the plurality of fourth wiring lines is located at a point of the diamond shape of each of the plurality of second virtual graphics; each of the plurality of third wiring lines and each of the plurality of fourth wiring lines are parallel to edges of the diamond shape, respectively;
wherein in the first metal pattern, at each junction of each of the plurality of first virtual graphics and the first touch electrode, there is a notch in each of the plurality of first virtual graphics; each of the plurality of first wiring lines is in a corresponding notch and is spaced apart from each of the plurality of first virtual graphics; and each of the plurality of second wiring lines is in a corresponding notch and is spaced apart from each of the plurality of first virtual graphics;
wherein for each notch, in a direction perpendicular to each of the plurality of first wiring lines or each of the plurality of second wiring lines in the each notch, a width of the each notch is in a range of from 8 μm to 10 μm.

2. The touch control device of claim 1, wherein materials of the plurality of first virtual graphics and the first touch control electrode are identical; and materials of the plurality of second virtual graphics and the second touch control electrode are identical.

3. A touch control display substrate comprising the touch control device of claim 1.

4. The touch control display substrate of claim 3, wherein the base substrate of the touch control device is reused as a base substrate of the touch control display substrate.

5. The touch control display substrate of claim 3, wherein the touch control display substrate further includes a plurality of sub-pixels; an orthographic projection of the plurality of sub-pixels to the base substrate is in the grid of the metal pattern.

6. The touch control display substrate of claim 5, wherein a shape of each cell of the grid is the same as a shape of each of the plurality of sub-pixels.

7. The touch control display substrate of claim 5, wherein the grid of the metal pattern is in a gap among the plurality of sub-pixels.

8. The touch control display substrate of claim 3, wherein the touch control display substrate is a flexible organic light emitting diode touch control display substrate.

9. A touch control display apparatus comprising the touch control display substrate of claim 3.

10. The touch control device of claim 1, wherein the first metal pattern and the second metal pattern are on an identical side of the base substrate.

11. The touch control device of claim 10, further comprising: a first insulation layer with a thickness in a range of from 500 Å to 5000 Å; wherein the first insulation layer is located between the first metal pattern and the second metal pattern; and a second insulation layer with a thickness in a range of from 500 Å to 5000 Å; wherein the second metal pattern is sandwiched between the second insulation layer and the first insulation layer.

12. The touch control device of claim 1, wherein the first touch control electrode includes a plurality of first grid units defined by the plurality of first wiring lines and the plurality of second wiring lines; an area of each of the plurality of first grid units is greater than an area of each of the plurality of first virtual graphics;

the second touch control electrode includes a plurality of second grid units defined by the plurality of third wiring lines and the plurality of fourth wiring lines; an area of each of the plurality of second grid units is greater than an area of each of the plurality of second virtual graphics.

13. The touch control device of claim 1, wherein every two adjacent first virtual graphics directly face each other; and every two adjacent second virtual graphics directly face each other.

14. The touch control device of claim 1, wherein every two adjacent first virtual graphics are insulated from each other; and every two adjacent second virtual graphics are insulated from each other.

15. A touch control device comprising:
a base substrate; and
a metal pattern on the base substrate;
wherein the metal pattern includes a first metal pattern and a second metal pattern; the first metal pattern and the second metal pattern are in different layers; the first metal pattern includes a first touch control electrode and a plurality of first virtual graphics that are insulated from the first touch control electrode and are spaced from each other; the second metal pattern includes a second touch control electrode and a plurality of second virtual graphics that are insulated from the second touch control electrode and are spaced from each other; and orthographic projections of the plurality of first virtual graphics to the base substrate and orthographic projections of the plurality of second virtual graphics to the base substrate are alternately arranged side by side without overlapping, thereby enabling an orthographic projection of the metal pattern to the base substrate to be a regular grid;
wherein all of the plurality of first virtual graphics are in a first layer; within the first layer, every two adjacent first virtual graphics are spaced from each other; and all of the plurality of second virtual graphics are in a second layer; within the second layer, every two adjacent second virtual graphics are spaced from each other;
wherein the first layer is spaced from the second layer in a direction perpendicularly to the base substrate;
wherein there are only the plurality of first virtual graphics which are spaced from each other, without other virtual graphics, in the first layer; and there are only the plurality of second virtual graphics which are spaced from each other, without other virtual graphics, in the second layer;
wherein patterns of the first metal pattern and the second metal pattern are identical;
wherein each of the plurality of first virtual graphics has a diamond shape, and each of the plurality of second virtual graphics has a diamond shape; the diamond shape of each of the plurality of first virtual graphics has the same size as the diamond shape of each of the plurality of second virtual graphics;
the first touch control electrode includes a plurality of parallel first wiring lines and a plurality of parallel second wiring lines; an intersection point of each of the plurality of first wiring lines and each of the plurality of second wiring lines is located at a point of the diamond shape of each of the plurality of first virtual graphics; each of the plurality of first wiring lines and each of the plurality of second wiring lines are parallel to edges of the diamond shape, respectively;
the second touch control electrode includes a plurality of parallel third wiring lines and a plurality of parallel fourth wiring lines; an intersection point of each of the plurality of third wiring lines and each of the plurality of fourth wiring lines is located at a point of the diamond shape of each of the plurality of second virtual graphics; each of the plurality of third wiring lines and each of the plurality of fourth wiring lines are parallel to edges of the diamond shape, respectively;
wherein in the first metal pattern, at each junction of each of the plurality of first virtual graphics and the first touch electrode, there is a notch in each of the plurality of first virtual graphics; each of the plurality of first wiring lines is in a corresponding notch and is spaced apart from each of the plurality of first virtual graphics; and each of the plurality of second wiring lines is in a corresponding notch and is spaced apart from each of the plurality of first virtual graphics;
wherein in the second metal pattern, at each junction of each of the second virtual graphics and the second touch electrode, there is a notch in each of the plurality of second virtual graphics; each of the plurality of third wiring lines is in a corresponding notch and is spaced apart from each of the plurality of second virtual graphics; and each of the plurality of fourth wiring lines is in a corresponding notch and is spaced apart from each of the plurality of second virtual graphics;
wherein for each notch in each of the plurality of second virtual graphics, in a direction perpendicular to each of the plurality of third wiring lines or each of the plurality of fourth wiring lines in the each notch in each of the plurality of second virtual graphics, a width of the each notch in each of the plurality of second virtual graphics is in a range of from 8 μm to 10 μm.

\* \* \* \* \*